US011917302B2

(12) United States Patent
Dong et al.

(10) Patent No.: US 11,917,302 B2
(45) Date of Patent: Feb. 27, 2024

(54) CAMERA EXPOSURE PROCESSING METHOD AND SYSTEM

(71) Applicant: HEFEI I-TEK OPTOELECTRONICS CO., LTD., Anhui (CN)

(72) Inventors: Ning Dong, Anhui (CN); Guiping Cao, Anhui (CN); Haixing Sun, Anhui (CN); Xue Wang, Anhui (CN)

(73) Assignee: HEFEI I-TEK OPTOELECTRONICS CO., LTD., Anhui (CN)

( * ) Notice: Subject to any disclaimer, the term of this patent is extended or adjusted under 35 U.S.C. 154(b) by 98 days.

(21) Appl. No.: 17/863,570

(22) Filed: Jul. 13, 2022

(65) Prior Publication Data

US 2022/0345612 A1 Oct. 27, 2022

Related U.S. Application Data

(63) Continuation of application No. PCT/CN2020/129417, filed on Nov. 17, 2020.

(30) Foreign Application Priority Data

Mar. 20, 2020 (CN) .......................... 202010203560.2

(51) Int. Cl.
*H04N 23/73* (2023.01)
*H04N 23/54* (2023.01)
(Continued)

(52) U.S. Cl.
CPC ............. *H04N 23/73* (2023.01); *H04N 23/54* (2023.01); *H04N 23/56* (2023.01); *H04N 23/74* (2023.01)

(58) Field of Classification Search
CPC ........ H04N 23/73; H04N 23/54; H04N 23/56; H04N 23/74; H04N 23/60
See application file for complete search history.

(56) References Cited

U.S. PATENT DOCUMENTS 10,515,245 B2 12/2019 Ynclino, V et al.
2015/0226675 A1 8/2015 Jiang et al.

FOREIGN PATENT DOCUMENTS

CN 102192729 A 9/2011
CN 104079831 A 10/2014
(Continued)

OTHER PUBLICATIONS

First Office Action dated Jun. 6, 2023 received in Japan Patent Application No. JP2022-542412.English translation attached.
(Continued)

*Primary Examiner* — Twyler L Haskins
*Assistant Examiner* — Angel L Garces-Rivera (57) ABSTRACT

The present disclosure discloses a camera exposure processing method and system. The method includes: obtaining trigger signals, the trigger signals being used to trigger the camera to collect image data and trigger the light source to turn on and off in turn in a fixed sequence; triggering cyclically n light sources to turn on in turn; triggering multiple sensor lines of the camera to perform image acquisition on the object simultaneously; extracting the image data of the exposed object under the turned-on light source collected by the multiple sensor lines to obtain effective data of the object, wherein a sequential lighting order is that after a former light source is cyclically turned on y times, a latter light source is cyclically turned on y times; and splicing all image data of the same position of the object to obtain a spliced image of the object under different light sources.

10 Claims, 5 Drawing Sheets

(51) Int. Cl.
*H04N 23/56* (2023.01)
*H04N 23/74* (2023.01)

(56) References Cited

FOREIGN PATENT DOCUMENTS

| CN | 104412585 A | 3/2015 |
|---|---|---|
| CN | 106091926 A | 11/2016 |
| CN | 107831167 A | 3/2018 |
| CN | 108121060 A | 6/2018 |
| CN | 108709497 A | 10/2018 |
| CN | 110319815 A | 10/2019 |
| CN | 110404816 A | 11/2019 |
| CN | 110412827 A | 11/2019 |
| CN | 110530796 A | 12/2019 |
| CN | 110798619 A | 2/2020 |
| CN | 111327835 A | 6/2020 |
| CN | 111327836 A | 6/2020 |
| EP | 1919197 A2 | 5/2008 |
| JP | 2022542411 A | 10/2022 |

OTHER PUBLICATIONS

International Search Report and Written Opinion dated Jan. 22, 2021 in International Application No. PCT/CN2020/129417. English translation attached.
First Office Action from corresponding Chinese Application No. 202010203560.2, dated Jan. 5, 2021. English translation attached.
Grant Notice & Supplymentary Search from corresponding Chinese Application No. 202010203560.2, dated May 25, 2021. English translation attached.
Second Office Action received in Japan Patent Application No. JP2022-542412, dated Sep. 19, 2023. English translation attached.
Grant Notice received in Japan Patent Application No. JP2022-542412, dated Nov. 21, 2023. English translation attached.

CAMERA EXPOSURE PROCESSING METHOD AND SYSTEM

CROSS-REFERENCE TO RELATED APPLICATIONS

This application is a continuation of International Application No. PCT/CN2020/129417, filed on Nov. 17, 2020, which claims priority to Chinese Patent Application No. 202010203560.2, entitled "CAMERA EXPOSURE PROCESSING METHOD AND SYSTEM" filed on Mar. 20, 2020 to China National Intellectual Property Administration. The disclosures of the aforementioned applications are hereby incorporated by reference in their entireties.

FIELD

The present disclosure relates to the technical field of industrial image acquisition of machine vision, and particularly to, a camera exposure processing method and system.

BACKGROUND

A linear array camera is a camera using a linear array image sensor. A typical field of application for linear array camera is the detection of a continuous material, such as metal, plastic, paper, fiber, or the like. The detected object usually moves at a uniform speed, and one or more cameras are used to scan it continuously line by line. After collecting one line in turn, it just moves to the next unit length and continues the collection of the next line, so as to achieve the uniform collection of its entire surface. At present, most of the industrial line scanning cameras commonly used in the market are single-line scanning cameras. However, in an actual detection and scanning operation, the image information acquired by single-line cameras often suffers from loss of information or image information insufficiency due to the light source and other problems.

To deal with the defects of the above single-line cameras, the traditional method commonly uses a plurality of single-line cameras in cooperation with a plurality of light sources to scan an object in order to obtain more image information. However, this method is not only cumbersome and slow, but also increases the number of cameras resulting in a large size of the device, which is not convenient for practical application and has a high cost.

SUMMARY

In view of the technical problems existing in the related art, the present disclosure provides a camera exposure processing method and system, which use a camera in cooperation with a plurality of light sources to scan a moving object, and have advantages of high acquisition efficiency, small volume, and high level of image recognition.

The present disclosure provides a camera exposure processing method, involving a camera and n light sources. The camera has a number N of sensor lines, where N is greater than or equal to n, and an object moves through a field of view of the camera in a certain direction. The camera exposure processing method includes: obtaining trigger signals, triggering, based on the trigger signals, the n light sources to turn on or turn off in a fixed sequence, and collecting image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$; splicing, in response to that image data of a same position of the object is collected by multiple sensor lines, all image data of the same position of the object to obtain a spliced image of the object under different light sources; and cyclically outputting the spliced image to obtain a complete image of the object.

Further, an a-th light source is Lamp-a. The n light sources are turned on based on the trigger signals in a sequence of Lamp-1-1, Lamp-1-2, . . . Lamp-1-$y$, Lamp-2-1, Lamp-2-2, . . . , Lamp-2-$y$, Lamp-a-1, Lamp-a-2, . . . , Lamp-a-$y$, where Lamp-a-y represents the a-th light source is turned on for a y-th time. After the last light source is turned on y times, it returns to a first light source and starts cyclically lighting again. Every time the light source is turned on, the image data of the object collected by operating sensor lines under an exposure of the light source turned on is extracted as effective data.

Further, when the number of light sources n is an odd number, y is an integer greater than or equal to 1; and when the number of light sources n is an even number, y is an integer greater than or equal to 2.

Further, in said obtaining trigger signals, triggering, based on the trigger signals, the n light sources to turn on or turn off in a fixed sequence, and collecting image data of the object under an exposure of the light source turned on, said obtaining the trigger signals includes: obtaining a trigger signal triggered in response to the object moving every a length Δl, the length Δl corresponding to a length of an object that is collectable by each sensor line, and the object being equally divided based on the length Δl.

Further, in said splicing, in response to that the image data of the same position of the object is collected by multiple sensor lines of the camera, all image data of the same position of the object, said splicing the effective data includes: writing the image data of the same position of the object collected by the multiple sensor lines at different times into multiple image caches, the multiple image caches respectively corresponding to the multiple sensor lines in one-to-one correspondence; and aligning the image data of the same position in the multiple image caches, and sequentially outputting the image data of the same position of the object collected by the multiple sensor lines to obtain the spliced image of the object under different light sources.

Further, said aligning the image data of the same position in the multiple image caches includes: aligning the image data of the same position by performing a line delay on each of the multiple sensor lines, wherein the multiple sensor lines of the camera are arranged in one line and are spaced apart from each other by a fixed distance, the fixed distance being a when a pixel of the camera is set to be a×a.

The present disclosure provides a camera exposure processing system using a camera and n light sources to perform image collection of an object. The camera has a number N of sensor lines, where N is greater than or equal to n. The camera exposure processing system includes: a trigger obtaining module configured to obtain trigger signals, trigger, based on the trigger signals, the n light sources to turn on or turn off in a fixed sequence, and collect image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$; a splicing module configured to, splice, in response to that image data of a same position of the object is collected by multiple sensor lines, all image data of the same position of the object to obtain a spliced image of the object under different light sources; and a cycle output module configured to cyclically output the spliced image to obtain a complete image of the object.

Further, the splicing module includes a cache module configured to write the image data of the same position of the object collected by multiple sensor lines at different times into multiple image caches, the multiple image caches respectively corresponding to the multiple sensor lines in one-to-one correspondence; and an alignment output module configured to align the image data of the same position in the multiple image caches, and sequentially output the image data of the same position of the object collected by the multiple sensor lines to obtain the spliced image of the object under different light sources.

A camera exposure processing apparatus includes a memory configured to store a computer program; and a processor. The computer program, when executed by the processor, implements the operations of: obtaining trigger signals, triggering, based on the trigger signals, the n light sources to turn on or turn off in a fixed sequence, and collecting image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$; splicing, in response to that image data of a same position of the object is collected by multiple sensor lines, all image data of the same position of the object to obtain a spliced image of the object under different light sources; and cyclically outputting the spliced image to obtain a complete image of the object.

A computer-readable storage medium, having a number of acquisition classification programs stored thereon. The number of acquisition classification programs are invoked by a processor to implement the operations of: obtaining trigger signals, triggering, based on the trigger signals, the n light sources to turn on or turn off in a fixed sequence, and collecting image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$; splicing, in response to that image data of a same position of the object is collected by multiple sensor lines, all image data of the same position of the object to obtain a spliced image of the object under different light sources; and cyclically outputting the spliced image to obtain a complete image of the object.

The camera exposure processing method and system provided by the present disclosure use the camera and the plurality of light sources to scan the moving object, and have the advantages of high collection efficiency, small volume, and high level of image recognition. The method saves the number of light sources used, makes the device compact, improves the utilization of space of the device to a great extent, brings together the characteristics detected at a plurality of working positions to one position for detection, and avoids errors caused by detections at the plurality of working positions. It can synchronously analyze the characteristics of object under the plurality of illuminations and effectively improve the recognition efficiency. At the same time, after the image data of a same position is obtained, a line delay is used to splice the image data of the same position and output the spliced image under different light sources, so as to further obtain the complete image of the object.

Reference numerals: 1—trigger obtaining module, 2—splicing module, 3—cycle output module, 21—cache module, and 22—alignment output module.

DESCRIPTION OF EMBODIMENTS

Hereinafter, the technical solution according to the present disclosure will be described in detail by specific embodiments.

Figure 1:
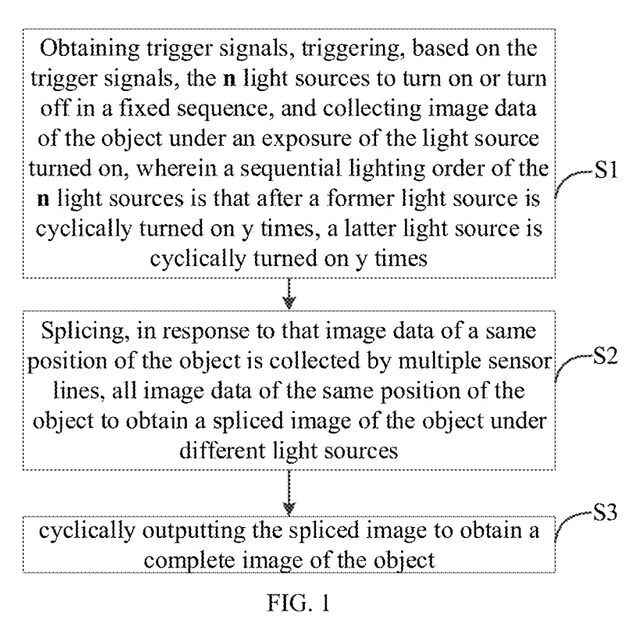
FIG. 1 is a flowchart illustrating a camera exposure processing method according to the present disclosure.

Referring to FIG. 1, a camera exposure processing method provided by the present disclosure involves s camera and n light sources, the camera has a number N of sensor lines, where N is greater than or equal to n, and an object moves through a field of view of the camera in a certain direction. The camera exposure processing method includes steps S1 to S3.

At step S1: the camera obtains trigger signals and triggers, based on the trigger signals, the n light sources to turn on or turn off in a fixed sequence, and collects image data of the object under an exposure of the light source turned on. A sequential lighting order of the n light sources is that after a former light source is cyclically turned on y times, a latter light source is cyclically turned on y times, where $2N-1 \geq (n-1) \times y + 1$.

When the number of light sources n is an odd number, y is an integer greater than or equal to 1. That is, each light source can be lit once in turn for circulation.

When the number of light sources n is an even number, y is an integer greater than or equal to 2, which avoids the defect that the image data collected of a same position is missed for half of the number of light sources, so that the multiple sensor lines can collect the same position under each light source.

At step S2: in response to that image data of a same position of the object is collected by multiple sensor lines, all image data of the same position of the object is spliced to obtain a spliced image of the object under different light sources.

At step S3, the spliced image is cyclically output to obtain a complete image of the object.

Through steps S1 to S3, a camera is used to cooperate with different light sources to perform an exposure processing on the object under different light sources in turn, and effective image data of the same position of the object obtained by the multiple sensors lines of the camera are spliced, so as to obtain image information under all different light sources and obtain sufficient data required for subsequent image processing. The method has advantages of small volume and high collection efficiency, and compared with other methods, has a lower cost, reflecting superior cost effectiveness. At the same time, the method makes the device compact, brings together features otherwise detected at a plurality of working positions to one position for detection, and avoids the errors caused by the detections at a plurality of working positions. It can synchronously analyze characteristics of object under the plurality of illuminations, and effectively improve the recognition efficiency.

Further, an a-th light source is Lamp-a. The n light sources are turned on based on the trigger signals in a sequence of Lamp-1-1, Lamp-1-2, . . . Lamp-1-y, Lamp-2-1, Lamp-2-2, . . . , Lamp-2-y, Lamp-a-1, Lamp-a-2, . . . , Lamp-a-y, where Lamp-a-y represents the a-th light source is turned on for a y-th time. When the last light source is turned on y times, it returns to a first light source and starts cyclically lighting again. Every time the light source is turned on, the image data of the object collected by operating sensor lines under an exposure of the light source turned on is extracted as effective data.

It should be understood that the multiple sensor lines of the camera include at least two sensor lines. When the camera is a four-line array camera, it means that there are four sensor lines. The number of sensor lines of the camera is greater than or equal to the number of the plurality of light sources, and the plurality of light sources can be light sources with different wavelengths, light sources with different brightness, and the like.

Further, step S1 of said obtaining the trigger signals includes steps S11 to S12.

At step S11: the length $\Delta l$ of the object that can be collected by each sensor line in the camera is calculated. The object is divided equally into M blocks based on the length $\Delta l$, and the length of each block is equal to $\Delta l$.

When each pixel of the sensor of the camera is a×a, a plurality of pixels is arranged into a line, each line is spaced apart from another by a. A sequence of the multiple sensor lines is set as L1 to Ln. Assuming an amplification factor of an photographing optical path is $\beta$, then the length of the object that can be captured by each sensor line is $\Delta l = a/\beta$.

At step S12: a trigger signal triggered in response to the object moving every a length $\Delta l$ is obtained.

A trigger signal is generated in response to the object moving every length $\Delta l$, which triggers the camera to perform data collection and ON and OFF of the corresponding light source.

It should be understood that the amplification factor of the photographing optical path is known for a determined camera, i.e., can be obtained directly. There is a signal control connection between the motion of the object and the camera and the power supply. At the same time, the images collected by the camera under different light sources can all reach a predetermined pixel resolution.

Further, in step S2 of splicing, in response to that the image data of the same position of the object is collected by multiple sensor lines, all image data of the same position of the object to obtain the spliced image of the object under different light sources, said splicing the effective data specifically includes steps S21 to S22.

At step S21: the image data of the same position of the object collected by multiple sensor lines at different times is written into multiple image caches, the multiple image caches respectively corresponding to the multiple sensor lines in one-to-one correspondence.

For example, the image data of the same position of the object collected by a first sensor line at time $T_1$ is written into a first image cache. The image data of the same position of the object collected by a second sensor line at time $T_2$ is written into a second image cache. The image data of the same position of the object collected by a Q-th sensor line at time $T_Q$ is written into a Q-th image cache.

At step S22: the image data of the same position in the multiple image caches is aligned, and the image data of the same position of the object collected by the multiple sensor lines is output sequentially to obtain the spliced image of the object under different light sources.

It should be understood that when the acquisition of the object is continuous, the multiple sensor lines perform photosensitive acquisition, caching, image processing at every time. When the acquisition of the object is not continuous, the multiple sensor lines perform photosensitive acquisition, caching, image processing at determined times.

Because there is a physical interval of a fixed distance between the multiple sensor lines, the data captured at the same time is not image information of the same position. An image dislocation will occur when image output is performed at the same time. Therefore, through steps S21 to S22, image data is aligned, data of different lines at different times is cached by different caches, and then a line delay is applied to splice the image data of the same position and output the spliced image data, thus completing a normal combination of the image.

Figure 2:
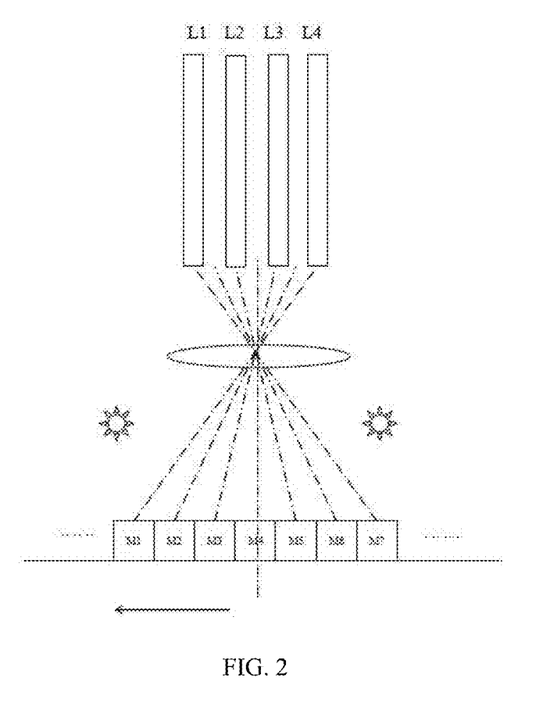
FIG. 2 is a schematic structural diagram illustrating an embodiment of a camera exposure processing method according to the present disclosure.
Figure 4:
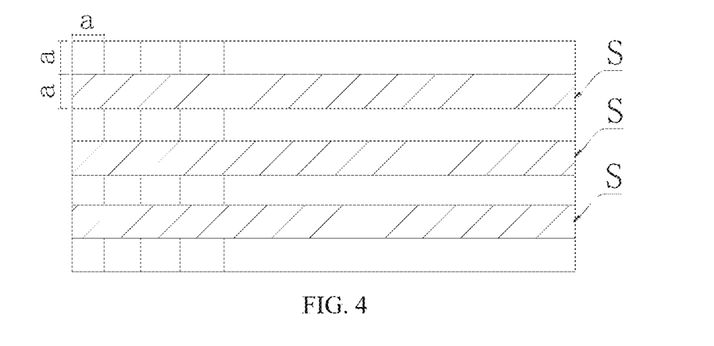
FIG. 4 is a schematic diagram illustrating a number of sensor lines of a four-line array camera in the embodiment of FIG. 2.

In a first embodiment, as illustrated in FIG. 2, the above camera exposure processing method is adopted to expose the object. In this example, the camera is selected as a four-line array camera, which cooperates with two light sources to collect the image; that is, a "four-line-two-lamp" mode is applied. For the convenience of explanation, take a section of the object for analysis, and divide the section of the object into seven equal blocks, such as M1 to M7 in FIG. 6. When scanning the object, an image under each light source can be obtained. Then the images are spliced into a big image and transmitted to a terminal (PC) for subsequent processing. Equivalently, the same position of the object is captured 4 times by two light sources in a sequence of Lamp 1, Lamp 2, Lamp 1, Lamp 2. Information of the object under a plurality of light sources and at a plurality of positions can be obtained at one time. When each pixel of the sensor of the four-line array camera is a×a, a plurality of pixels is arranged in a line, as illustrated in FIG. 4. An interval S between adjacent lines is set as a, and a sequence of multiple sensor lines is determined as a first sensor line L1, a second sensor line L2, a third sensor line L3, and a fourth sensor line L4. Hence there are a total of four sensor lines and three fixed-distance intervals in the four-line array camera, as illustrated in FIG. 2. The object is imaged on the multiple sensor lines through lens of the four-line array camera. There are two external light sources, which are controlled by the four-line array camera. The four-line array camera is in an externally-triggered acquisition mode, and the object moves through the field of view of the camera in a certain direction. Assuming the amplification factor of the optical path is $\beta$, since a pixel width in the moving direction is a, the interval between blocks of the object is $\Delta l = a/\beta$. The object moves the length $\Delta l$, i.e. the length of one block of the object, during time T of each photographing.

Figure 3:
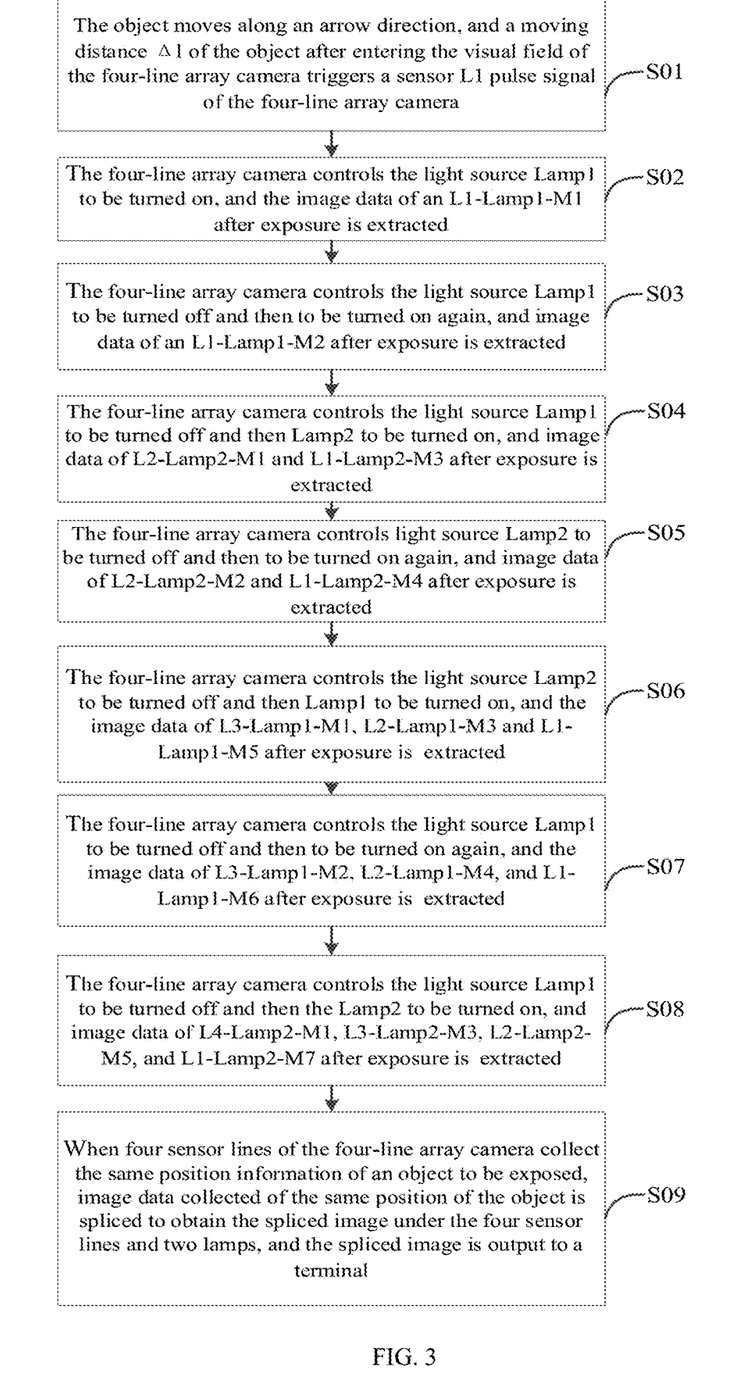
FIG. 3 is a flowchart illustrating an implementation of the embodiment of FIG. 2.

As illustrated in FIG. 2 and FIG. 3, in order to obtain a capturing condition for the two light sources, when each light source is controlled to be turned on y=2 times, the two light sources are respectively turned on in turn. An exposure process thereof is illustrated in FIG. 2 to FIG. 6, including steps S01 to S10.

At step S01: the object moves along an arrow direction, and a moving distance Δl of the object after entering the visual field of the four-line array camera triggers a sensor L1 pulse signal of the four-line array camera.

At step S02: at a time 0, the four-line array camera controls the light source Lamp1 to be turned on, and the image data of an L1-Lamp1-M1 after exposure is extracted.

At step S03: at a time 1, the four-line array camera controls the light source Lamp1 to be turned off and then to be turned on again, and image data of an L1-Lamp1-M2 after exposure is extracted. The L1-Lamp1-M2 is an image of an object block M2 under a light source Lamp1, which is acquired by L1.

At step S04: at a time 2, the four-line array camera controls the light source Lamp1 to be turned off and then Lamp2 to be turned on, and image data of L2-Lamp2-M1 and image data of L1-Lamp2-M3 after exposure are extracted.

At step S05: at a time 3, the four-line array camera controls the light source Lamp2 to be turned off and then to be turned on again, and image data of L2-Lamp2-M2 and image data of L1-Lamp2-M4 after exposure are extracted.

At step S06: at a time 4, the four-line array camera controls the light source Lamp2 to be turned off and then Lamp1 to be turned on, and the image data of L3-Lamp1-M1, L2-Lamp1-M3 and L1-Lamp1-M5 after exposure is extracted.

At step S07: at a time 5, the four-line array camera controls the light source Lamp1 to be turned off and then to be turned on again, and the image data of L3-Lamp1-M2, L2-Lamp1-M4, and L1-Lamp1-M6 after exposure is extracted.

At step S08: at a time 6, the four-line array camera controls the light source Lamp1 to be turned off and then the Lamp2 to be turned on, and image data of L4-Lamp2-M1, L3-Lamp2-M3, L2-Lamp2-M5, and L1-Lamp2-M7 after exposure is extracted.

At step S09: L1-Lamp1-M1, L2-Lamp2-M1, L3-Lamp1-M1, and L4-Lamp2-M1 are all image data corresponding to M1 and are spliced to obtain a spliced image of M1, and the spliced image is output to a terminal.

At step S10: when four sensor lines of the four-line array camera all collect the same position information of an object to be exposed, image data collected of the same position of the object is spliced cyclically to obtain the spliced image under the four sensor lines and two lamps, and the spliced image is output to a terminal.

Figure 6:
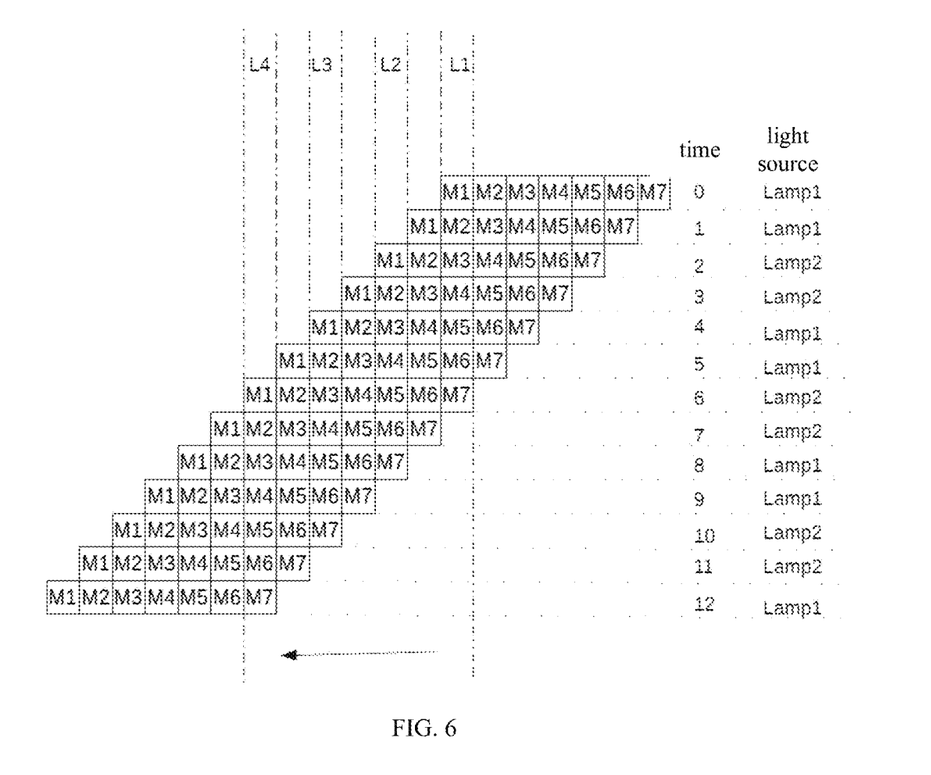
FIG. 6 is a schematic diagram illustrating an image acquisition process in a first embodiment of FIG. 2.

For the above steps S01 to S09, in order to simplify an explanation process and an imaging model, a static discrete approximate model is adopted. For convenience of explanation, take a section of the object for analysis, such as M1 to M7 in FIG. 6. Supposing the moving speed of the object is v, a trigger signal of a trigger pulse will be generated in response to the object moving every distance Δl. After a time t, the movement distance is L=vt, a number of n=L/Δl trigger pulses are output, and the number of generated images is also n. When the object passes from right to left in turn, the entire imaging process is illustrated in FIG. 6, which is divided into different times based on a unit interval time T. From time 0, the object passes through the field of view, and each sensor line captures a part of the surface of the object every time. The entire surface of the object is scanned by the same line exactly once. FIG. 6 illustrates an actual image acquisition process.

Figure 8:
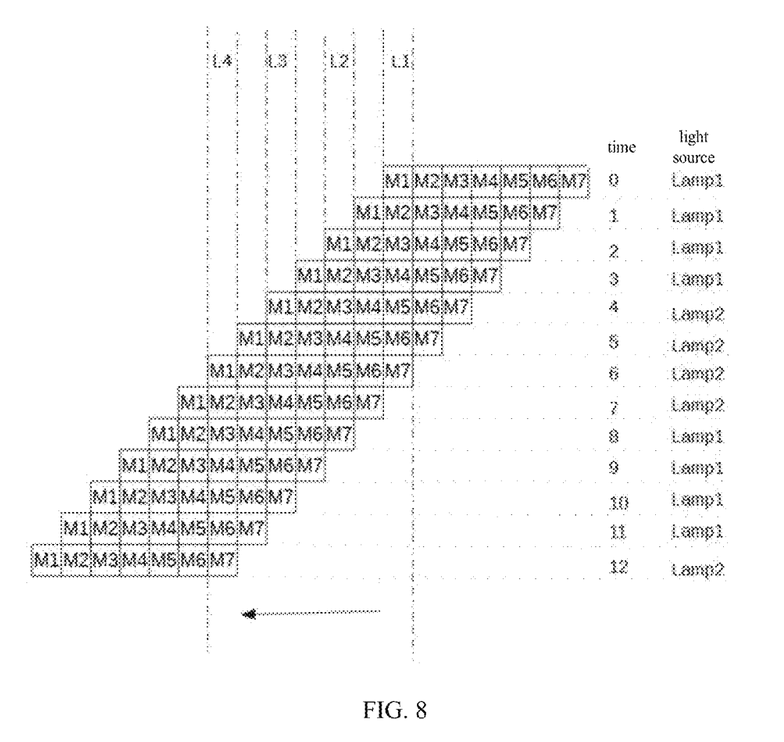
FIG. 8 is a schematic diagram illustrating an image acquisition process in a second embodiment of FIG. 2.

In a second embodiment, the "four-line-two-lamp" mode of the first embodiment is selected, the intervals between the multiple sensor lines are also same, the object is also divided into M1 to M7 blocks, and the object moves one block to trigger a trigger signal. The difference between this embodiment and the first embodiment is that when each light source is controlled to be turned on y=4 times, the two light sources are turned on in turn, as illustrated in FIG. 8. The exposure process includes steps S111 to S1011.

At step S111: the object moves along an arrow direction, and a moving distance of the object after entering the visual field of the four-line array camera triggers a sensor L1 pulse signal of the four-line array camera.

At step S211: at a time 0, the four-line array camera controls the light source Lamp1 to be turned on, and image data of L1-Lamp1-M1 after exposure is extracted. The L1-Lamp1-M1 is an image of an M1 object block under the light source Lamp1, which is acquired by L1.

At step S311: at a time 1, the four-line array camera controls the light source Lamp1 to be turned off and then to be turned on again, and image data of L1-Lamp1-M2 after exposure is extracted.

At step S411: at a time 2, the four-line camera controls the light source Lamp1 to be turned off and then to be turned on again, and image data of L2-Lamp1-M1 and image data of L1-Lamp1-M3 after exposure are extracted.

At step S511: at a time 3, the four-line array camera controls the light source Lamp1 to be turned off and then to be turned on again, and image data of L2-Lamp2-M2 and image data L1-Lamp2-M4 after exposure are extracted.

At step S611: at a time 4, the four-line array camera controls the light source Lamp1 to be turned off and then the Lamp2 to be turned on, and image data of L3-Lamp2-M1, L2-Lamp2-M3, and L1-Lamp2-M5 after exposure is extracted.

At step S711: at a time 5, the four-line array camera controls light source Lamp2 to be turned off and then to be turned on again, and the image data of L3-Lamp2-M2, L2-Lamp2-M4, and L1-Lamp2-M6 after exposure is extracted.

At step S811: at a time 6, the four-line array camera controls the light source Lamp2 to be turned off and then to be turned on again, and image data of L4-Lamp2-M1, L3-Lamp2-M3, L2-Lamp2-M5, and L1-Lamp2-M7 after exposure is extracted.

At step S911: L1-Lamp1-M1, L2-Lamp1-M1, L3-Lamp2-M1, and L4-Lamp2-M1 are all image data corresponding to M1 and are spliced to obtain a spliced image of M1, and the spliced image is output to a terminal.

At step S1011: when four sensor lines of the four-line array camera all collect the information of the same position of the object to be exposed, the collected image data of the same position of the object is spliced cyclically to obtain the spliced image under the four sensor lines and two light sources, and the spliced image is output to the terminal.

Figure 5:
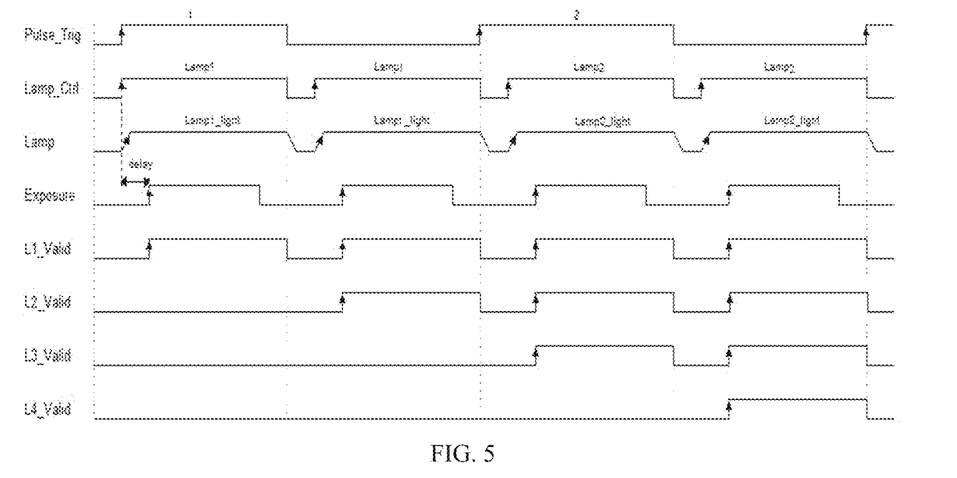
FIG. 5 is a schematic diagram illustrating a control timing of light sources in the embodiment of FIG. 2.

As illustrated in FIG. 5, the first embodiment and the second embodiment described above use different caches to cache data of different lines and different times, and then perform the line delay. There is a certain delay in exposure relative to the lighting time of the light sources, so as to align the image data, obtain the image data of the same position under different light sources, and complete a normal combination of images.

As illustrated in FIG. 2 to FIG. 6, for the first embodiment and the second embodiment described above, when the four-line array camera cooperates with two light sources to expose an object to be exposed, specific steps of image splicing are as follows.

At step S001: image data of an object collected by a first sensor line L1 at time 0/1 is written into a first partial image cache.

At step S002: image data of the object collected by the first sensor line L1 at time 2/3 is written into the first partial image cache; simultaneously image data of the object collected by a second sensor line L2 is written into a second partial image cache.

At step S003: image data of the object collected by the first sensor line L1 at time 4/5 is written into the first partial image cache, the image data of the object collected by the second sensor line L2 is written into the second partial image cache, and the image data of the object collected by a third sensor line L3 is written into a third partial image cache;

At step S004: image data of the object collected by the first sensor line L1 at time 6/7 is written into the first partial image cache; the image data of the object collected by the second sensor line L2 is written into the second partial image cache, the image data of the object collected by the third sensor line L3 is written into the third partial image cache, and image data of the object collected by a fourth sensor line L4 is written into a fourth partial image cache.

At step S005: image data at a time 6 is aligned, and image data of the first line L1, the second line L2, the third line L3, and the fourth line L4 at the M1 block of the object is spliced to obtain a spliced image of the M1 block of the object under different light sources.

At step S006: spliced images of the objects 2 to 7 under different light sources are obtained in sequence, and the spliced images of the object 1 to object 7 are transmitted to a terminal to obtain a complete image of the object at the selected section.

The above process continues to output all the spliced images of the object to the terminal, to obtain a complete image of the object.

Figure 7:
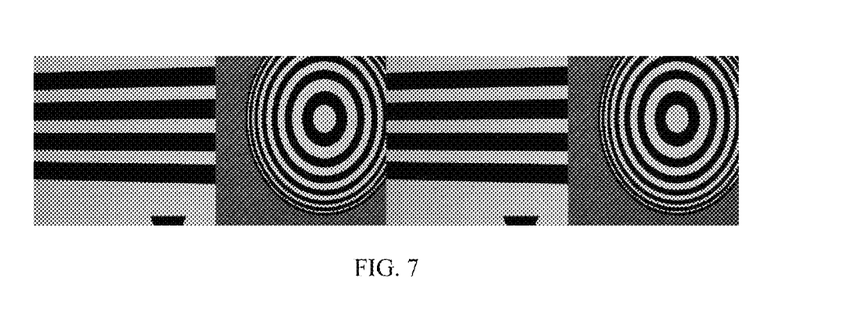
FIG. 7 is a schematic diagram illustrating an output result after a splicing of image data in the embodiment of FIG. 2.

Specifically, after the object passes through the field of view of the camera, four images under different light sources can be obtained. After integration and output, the result is as illustrated in FIG. 7, and the images of the object under four different light sources are obtained.

It should be understood that the camera in this embodiment may not only be a four-line array camera, but may also be a two-line array camera, a six-line array camera or other forms of linear array camera. The number of light sources is not limited to two but may be other numbers smaller than the number of sensing lines of the camera. The present embodiment only describes, with respect to a four-line-two-lamp camera, an exposure processing method where the camera cooperates with the plurality of light sources.

Figure 9:
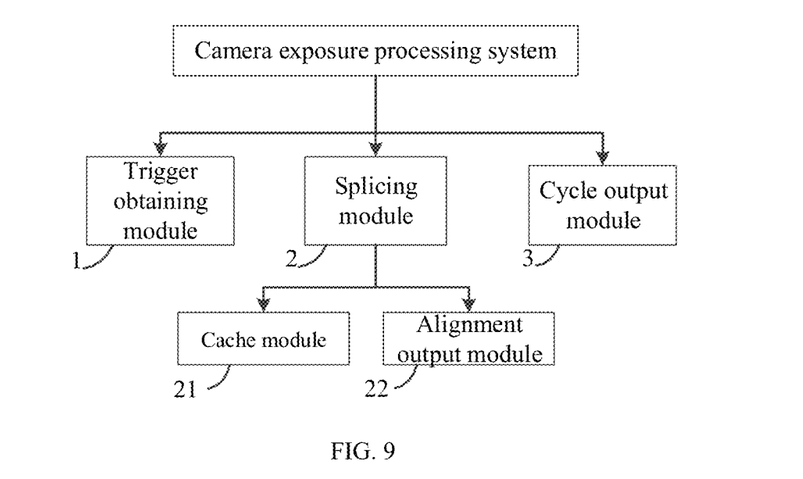
FIG. 9 is a flow diagram illustrating a camera exposure processing system.

As illustrated in FIG. 9, a camera exposure processing system including a camera and n light sources is provided. The camera has a number N of sensor lines, where N is greater than or equal to n, and an object moves through a field of view of the camera in a certain direction. The camera exposure processing system includes a trigger obtaining module 1, a splicing module 2, and a cycle output module 3.

The trigger obtaining module 1 is configured to: obtain trigger signals; trigger, based on the trigger signals, the n light sources to turn on or turn off in a fixed sequence; and collect image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$.

The splicing module 2 is configured to splice, in response to that image data of a same position of the object is collected by multiple sensor lines, all image data of the same position of the object to obtain a spliced image of the object under different light sources.

The cycle output module 3 is configured to cyclically output the spliced image to obtain a complete image of the object.

Further, the splicing module 2 includes a cache module 21 and an alignment output module 22.

The cache module 21 is configured to write the image data of the same position of the object collected by multiple sensor lines at different times into multiple image caches, the multiple image buffers respectively corresponding to the multiple sensor lines in one-to-one correspondence.

The alignment output module 22 is configured to align the image data of the same position in the multiple image caches, and sequentially output the image data of the same position of the object collected by the multiple sensor lines to obtain the spliced image of the object under different light sources.

A camera exposure processing apparatus includes a memory and a processor.

The memory is configured to store a computer program.

The computer program, when executed by the processor, implement the operations of: obtaining trigger signals, triggering, based on the trigger signals, the n light sources to turn on or turn off in a fixed sequence, and collecting image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$; splicing, in response to that image data of a same position of the object is collected by multiple sensor lines, all image data of the same position of the object to obtain a spliced image of the object under different light sources; and cyclically outputting the spliced image to obtain a complete image of the object.

A computer-readable storage medium has a number of acquisition classification programs stored thereon. The number of acquisition classification programs are invoked by a processor to implement the operations of: obtaining trigger signals, triggering, based on the trigger signals, the n light sources to turn on or turn off in a fixed sequence, and collecting image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$; splicing, in response to that image data of a same position of the object is collected by multiple sensor lines, all image data of the same position of the object to obtain a spliced image of the object under different light sources; and cyclically outputting the spliced image to obtain a complete image of the object.

Those of ordinary skill in the art will understand that all or part of the steps for implementing method embodiments may be implemented by hardware related to program instructions. The program may be stored in a computer-readable storage medium, and when executed, performs the steps including the method embodiments. The aforementioned storage medium includes various media capable of storing program codes, such as ROM, RAM, magnetic disk or optical disk.

The above description is only embodiments of the present disclosure, and the scope of protection of the present disclosure is not limited thereto. Any equivalent substitution or change made by any person skilled in the art according to the technical solution of the present disclosure and the inventive concept thereof within the technical scope disclosed by the present disclosure should be included in the scope of protection of the present disclosure.

What is claimed is:

1. A camera exposure processing method, involving a camera and n light sources, wherein the camera has a number N of sensor lines, where N is greater than or equal to n, and wherein an object moves through a field of view of the camera in a certain direction, the camera exposure processing method comprising:
    obtaining trigger signals, triggering, based on the trigger signals, the n light sources to turn on or turn off in a fixed sequence, and collecting image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$;
    splicing, in response to that image data of a same position of the object is collected by multiple sensor lines, all image data of the same position of the object to obtain a spliced image of the object under different light sources; and
    cyclically outputting the spliced image to obtain a complete image of the object.

2. The camera exposure processing method according to claim 1, wherein
    an a-th light source is Lamp-a,
    the n light sources are turned on based on the trigger signals in a sequence of Lamp-1-1, Lamp-1-2, . . . Lamp-1-y, Lamp-2-1, Lamp-2-2, . . . , Lamp-2-y, Lamp-a-1, Lamp-a-2, . . . , Lamp-a-y, where Lamp-a-y represents the a-th light source is turned on for a y-th time,
    after the last light source is turned on y times, it returns to a first light source and starts cyclically lighting again, and
    every time the light source is turned on, the image data of the object under an exposure of the light source turned on is collected by the sensor lines.

3. The camera exposure processing method according to claim 1, wherein when the number of light sources n is an odd number, y is an integer greater than or equal to 1; and when the number of light sources n is an even number, y is an integer greater than or equal to 2.

4. The camera exposure processing method according to claim 1, wherein in said obtaining the trigger signals, triggering, based on the trigger signals, the n light sources to turn on or turn off in the fixed sequence, and collecting image data of the object under the exposure of the light source turned on, said obtaining the trigger signals comprises:
    obtaining a trigger signal triggered in response to the object moving every a length Δl, the length Δl corresponding to a length of an object that is collectable by each sensor line, and the object being equally divided based on the length Δl.

5. The camera exposure processing method according to claim 1, wherein in said splicing, in response to that the image data of the same position of the object is collected by multiple sensor lines, all image data of the same position of the object to obtain the spliced image of the object under different light sources, said splicing all the image data of the same position of the object comprises:
    writing the image data of the same position of the object collected by the multiple sensor lines at different times into multiple image caches, the multiple image caches respectively corresponding to the multiple sensor lines in one-to-one correspondence; and
    aligning the image data of the same position of the object in the multiple image caches, and sequentially outputting the image data of the same position of the object collected by the multiple sensor lines to obtain the spliced image of the object under different light sources.

6. The camera exposure processing method according to claim 5, wherein said aligning the image data of the same position in the multiple image caches comprises:
    aligning the image data of the same position by performing a line delay on each of the multiple sensor lines, wherein the multiple sensor lines of the camera are arranged in one line and are spaced apart from each other by a fixed distance, the fixed distance being a when a pixel of the camera is set to be a×a.

7. A camera exposure processing apparatus, comprising:
    a memory configured to store a computer program; and
    a processor,
    wherein the computer program, when executed by the processor, implements the method according to claim 1.

8. A computer-readable storage medium, having a number of acquisition classification programs stored thereon, wherein the number of acquisition classification programs are invoked by a processor to implement the method according to claim 1.

9. A camera exposure processing system, comprising a camera and n light sources, wherein the camera has a number N of sensor lines, where N is greater than or equal to n, and wherein an object moves through a field of view of the camera in a certain direction, the camera exposure processing system comprising:
    a trigger obtaining module (1) configured to: obtain trigger signals, trigger, based on the trigger signals, the n light sources to turn on or turn off in a fixed sequence, and collect image data of the object under an exposure of the light source turned on, wherein a sequential lighting order of the n light sources is that after a former light source is cyclically turned on y times, a latter light source is cyclically turned on y times, where $2N-1 \geq (n-1) \times y + 1$;
    a splicing module (2) configured to splice, in response to that image data of a same position of the object is collected by multiple sensor lines, all image data of the same position of the object to obtain a spliced image of the object under different light sources; and
    a cycle output module (3) configured to cyclically output the spliced image to obtain a complete image of the object.

10. The camera exposure processing method according to claim 9, wherein the splicing module (2) comprises:
    a cache module (21) configured to write the image data of the same position of the object collected by multiple sensor lines at different times into multiple image caches, the multiple image caches respectively corresponding to the multiple sensor lines in one-to-one correspondence; and
    an alignment output module (22) configured to align the image data of the same position in the multiple image caches, and sequentially output the image data of the same position of the object collected by the multiple sensor lines to obtain the spliced image of the object under different light sources.

\* \* \* \* \*